United States Patent
Yakovlev et al.

(10) Patent No.: US 7,200,694 B2
(45) Date of Patent: Apr. 3, 2007

(54) SERVICING MULTIPLE HOT-PLUG EVENTS UTILIZING A COMMON EVENT SIGNAL IN PROVIDING HOT-PLUG ATTENTION BUTTON SUPPORT

(75) Inventors: Sergiy B. Yakovlev, Duluth, GA (US); Jason Rohr, Sugar Hill, GA (US)

(73) Assignee: American Megatrends, Inc., Norcross, GA (US)

( * ) Notice: Subject to any disclaimer, the term of this patent is extended or adjusted under 35 U.S.C. 154(b) by 473 days.

(21) Appl. No.: 10/449,276

(22) Filed: May 30, 2003

(65) Prior Publication Data
US 2004/0243725 A1    Dec. 2, 2004

(51) Int. Cl.
G06F 3/00      (2006.01)
G06F 13/12    (2006.01)
G06F 13/24    (2006.01)
G06F 13/00    (2006.01)

(52) U.S. Cl. ............... 710/48; 710/15; 710/62; 710/300; 710/301; 710/302; 710/260

(58) Field of Classification Search ............... 710/36, 710/260, 300, 301, 302, 303, 304
See application file for complete search history.

(56) References Cited

U.S. PATENT DOCUMENTS 5,819,053 A * 10/1998 Goodrum et al. ............ 710/100
6,101,322 A * 8/2000 Goodrum et al. ............ 710/302
6,578,099 B1 * 6/2003 Bassman et al. ............. 710/301
2003/0065752 A1 * 4/2003 Kaushik et al. .............. 709/220

OTHER PUBLICATIONS

PCI Hot-Plug Specification, Revision 1.1, Jun. 20, 2001.*
PCI Standard Hot-Plug Controller and Subsystem Specification, Revision 1.0, Jun. 20, 2001.*

* cited by examiner

Primary Examiner—Kim Huynh
Assistant Examiner—Alan S. Chen
(74) Attorney, Agent, or Firm—Hope Baldaliff Hartman, LLC (57) ABSTRACT

Each attention button is tied to a presence signal, which is also used to detect the presence of a PCI adapter card within a slot. By comparing HPPC register states, pending due to a system control interrupt ("SCI"), with stored HPPC register states prior to the SCI, the HPPC is able to distinguish between an attention button press and a PCI card insertion or removal and therefore may respond appropriately to the SCI. According to the method, SCIs generated in a computer system by attention buttons are diagnosed and serviced by storing the contents of the HPPC registers. The contents of the registers identify the state of the presence and manually-operated retention latch ("MRL") signals prior to the occurrence of a SCI and upon receiving a SCI corresponding to a state change for either signal, identify the hot plug controller and the slot where the interrupt occurred.

25 Claims, 8 Drawing Sheets

PRESENCE SIGNAL REGISTER — 703

| SLOT | 1 | 2 | 3 | 4 | 5 | 6 | 7 | 8 |
|---|---|---|---|---|---|---|---|---|
| IPER | 1 | 1 | 1 | 1 | 0 | 1 | | |
| STORED | 1 | 1 | 1 | 1 | 1 | 1 | | |
| XOR | 0 | 0 | 0 | 0 | 1 | 0 | | |

MRL SIGNAL REGISTER — 705

| SLOT | 1 | 2 | 3 | 4 | 5 | 6 | 7 | 8 |
|---|---|---|---|---|---|---|---|---|
| IPER | 1 | 1 | 1 | 1 | 1 | 1 | | |
| STORED | 1 | 1 | 1 | 1 | 1 | 1 | | |
| XOR | 0 | 0 | 0 | 0 | 0 | 0 | | |

PRESENCE SIGNAL REGISTER AFTER UPDATE — 707

| SLOT | 1 | 2 | 3 | 4 | 5 | 6 | 7 | 8 |
|---|---|---|---|---|---|---|---|---|
| IPER | 1 | 1 | 1 | 1 | 0 | 1 | | |
| STORED | 1 | 1 | 1 | 1 | 0 | 1 | | |
| XOR | | | | | | | | |

*Fig. 7B*

SERVICING MULTIPLE HOT-PLUG EVENTS UTILIZING A COMMON EVENT SIGNAL IN PROVIDING HOT-PLUG ATTENTION BUTTON SUPPORT

TECHNICAL FIELD

The invention relates generally to the field of peripheral interfaces within a computer system and, more particularly, to the field of diagnosing and responding to attention button signals generated within a peripheral interface platform.

BACKGROUND OF THE INVENTION

Computers have become an integral part of society. The demands on computers, especially in server type environments, have increased to a point where they are expected to operate on a continual basis. Because over time certain computer components may need to be installed or removed for upgrade, repair, or maintenance some computer systems provide a means for insertion or removal of peripheral components while the system is running. For instance, some desktop and server computer systems utilize hot-plug Peripheral Component Interconnect controllers ("HPPC"). HPPCs manage the electrical aspects of powering up or down hot-plug slots. Through HPPC's and corresponding slots in a computer system, Peripheral Component Interconnect ("PCI") devices or adapter cards can be removed from or inserted into slots while the system is actively running.

In order to facilitate hot-plug removal, insertion, and slot re-enumeration, a mechanism is required to inform the computer system that a change is pending. This notification brings the pending change to the computer system's attention, thereby enabling the HPPC to power up or down the appropriate slot and the operating system to re-enumerate. Previous systems accomplished notification with a mechanical retention latch ("MRL") that triggers a signal to the HPPC when the MRL is opened or closed. Because of potential electrocution or system damage, power can be removed immediately from a slot when an MRL is opened. However, opening a MRL that powers down a slot immediately does not leave enough time to notify the operating system and re-enumerate. Thus immediate power removal, in some cases, could cause unpredictable results such as data corruption. Subsequent specifications for standard HPPC's now provide for an attention button signal that may be used to notify the operating system of a request for removal or insertion of a PCI adapter card. However, some HPPC platforms are not equipped with a discrete attention button signal as described by the specification. Consequently, other provisions are necessary for non-standard HPPC platforms to determine whether an attention button has been pressed.

For instance, the attention button may be tied to a presence signal, an existing signal within the HPPC platform that is also used to detect the presence of a PCI adapter card within a slot and the card's power requirements. Because the presence signal is shared between card presence detection and the attention button, provisions are necessary to distinguish between an attention button press and a PCI card insertion or removal so the HPPC may respond appropriately.

It is with respect to these considerations and others that the various embodiments of the invention have been made.

SUMMARY OF THE INVENTION

In accordance with the present invention, the above and other problems are solved by methods and systems for servicing multiple hot-plug events with a common event signal in providing hot-plug attention button support in non-standard HPPC platforms. These platforms tie the attention button to a presence signal, which is also used to detect the presence and power consumption of a PCI adapter card within a slot. By comparing HPPC register states, pending due to a system control interrupt ("SCI"), with stored HPPC register states prior to the SCI, the HPPC is able to distinguish between an attention button press and a PCI card insertion or removal and therefore may respond appropriately to the SCI. According to the method, SCIs generated in a computer system by attention buttons are diagnosed and serviced by storing the contents of the HPPC registers, which identify the state of the presence and MRL signals prior to the occurrence of a SCI, and upon receiving a SCI corresponding to a state change for either signal, identifying the hot plug controller and the slot where the interrupt occurred.

After identifying the SCI source slot, a determination is made as to whether a state change in the presence signal for the slot was caused by a press of the attention button by comparing the stored and current states of the presence signal in the HPPC register and comparing the stored and current states of the MRL signal. If a presence signal state for the slot has changed while the MRL signal for the same slot remains unchanged, the SCI was caused by the press of an attention button. Once the press of the attention button is confirmed the HPPC executes a procedure to service the interrupt and store an updated state for the serviced interrupt slot. For example the HPPC may remove power and bus signals from the slot so a PCI card may be removed.

In accordance with other aspects, the present invention relates to a method and system for diagnosing and servicing SCIs that are generated by one general purpose event ("GPE") signal. This one GPE may be asserted by any of the HPPCs in the computer system in response to any of the HPPC slots experiencing a slot event such as a press of an attention button, removal or insertion of a PCI card, or the opening or closing of a MRL. The slot and HPPC that asserts the GPE that generates the SCI are also identified by reading and comparing the HPPC pending event registers for the presence and MRL signals with the stored state of the signals before the interrupt occurred. The slot and HPPC that generates the SCI are identified during the comparison by a difference between the stored and current state of either signal for a slot.

In accordance with other aspects, the present invention relates to a method for providing attention button support where the contents of the HPPC registers are initially stored during an initialization of the HPPCs. This initialization process disables all slot event interrupts while verifying the power status of each slot for all HPPCs. If a slot is in a powered state, the presence signal interrupt for that slot is enabled. In contrast, if a slot is in a powered off state, the presence signal interrupt remains disabled. After the power states are verified all the MRL interrupts are enabled, consequently a GPE will be asserted for all MRLs that change position, however a GPE will not be asserted for an attention button press for a slot in a powered off state. Next, the pending SCIs are serviced to place the hot plug controllers in an operating condition. Finally, the states of both the presence signal and the MRL signal for each slot are stored for future reference.

Based on initializing the HPPCs, a determination may be made as to whether an attention button generated the SCI by determining whether the MRL signal for the identified slot has changed and verifying whether the identified slot has an enabled presence signal interrupt. If the slot presence signal interrupt has been disabled the SCI was not generated by the attention button. In contrast if the presence signal interrupt is enabled for the identified slot and the MRL signal for that slot has not changed, then the SCI was caused by a press of the attention button for that slot.

In accordance with still other aspects, the present invention relates to a method for aborting the servicing of a SCI initiated by the press of an attention button by a second press of the attention button within a specified time. If the attention button is not pressed a second time within a specified time, the SCI is serviced. For example, power may be removed from a powered slot in response to pressing the attention button once and foregoing the second press. After the initial press of an attention button, an attention indicator, controlled from the HPPC, may flash for the same specified time to indicate that service for the SCI may be aborted while the attention indicator is flashing. This attention indicator may have a specified color. Furthermore, a power indicator, in an 'on' status for powered slots, may flash after the initial press of an attention button indicating that a power operation is pending. If the attention button is pressed again within a specified time to abort SCI service, the power indicator will return to 'on' status. If the second press does not occur until after the specified time, the power indicator will continue to flash until power is removed and the SCI service is complete. The power indicator will then turn to 'off' status. This power indicator may also have a specified color different than the attention indicator.

In accordance with still other aspects, the present invention relates to a computer system capable of providing attention button support to a HPPC platform. In particular, the computer system includes a processor, a memory, and at least one bus coupled to the processor and memory capable of hosting one or more bridge devices. The system also includes an Advanced Configuration and Power Interface ("ACPI") BIOS program capable of being executed on the processor and, when executed on the processor, operative to store the contents of the HPPC registers that identify the state of each signal for each slot, receive an interrupt corresponding to a state change for the presence or MRL signals, and in response to receiving the interrupt, identify the HPPC and slot where the interrupt occurred. Furthermore, the ACPI is operative to determine, based on a stored and current state of the presence signal and a stored and current state of the MRL signal, whether a state change in the presence signal was caused by a press of the attention button, and in response to determining that the presence signal state change was caused by the press of an attention button, execute a procedure to service the interrupt and store an updated state of the serviced interrupt slot.

In accordance with other aspects, the ACPI is further operative to receive an interrupt corresponding to a state change for either signal wherein the interrupt is generated by one general purpose event that may be asserted by any hot plug controller in response to any slot event. Furthermore, ACPI is operative to in response to determining that the slot has an enabled interrupt for the first interface state and that no change has occurred in the slot for the second interface state, determining whether a second press of the attention button has occurred within a specified time and in response to the second press occurring within a specified time, executing a procedure to service the interrupt and store an updated state for the serviced interrupt slot.

The invention may be implemented as a computer process, a computing system, or as an article of manufacture such as a computer program product or computer-readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

DETAILED DESCRIPTION

Referring now to the drawings, in which like numerals represent like elements, a computer hardware architecture for a computer utilized in the various embodiments of the invention will be described. In particular, FIGS. 1–3 and the corresponding discussion are intended to provide a brief, general description of a suitable computing environment in which embodiments of the invention may be implemented. While the invention will be described in the general context of program modules that execute as a portion of the operation of a computer operating system, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
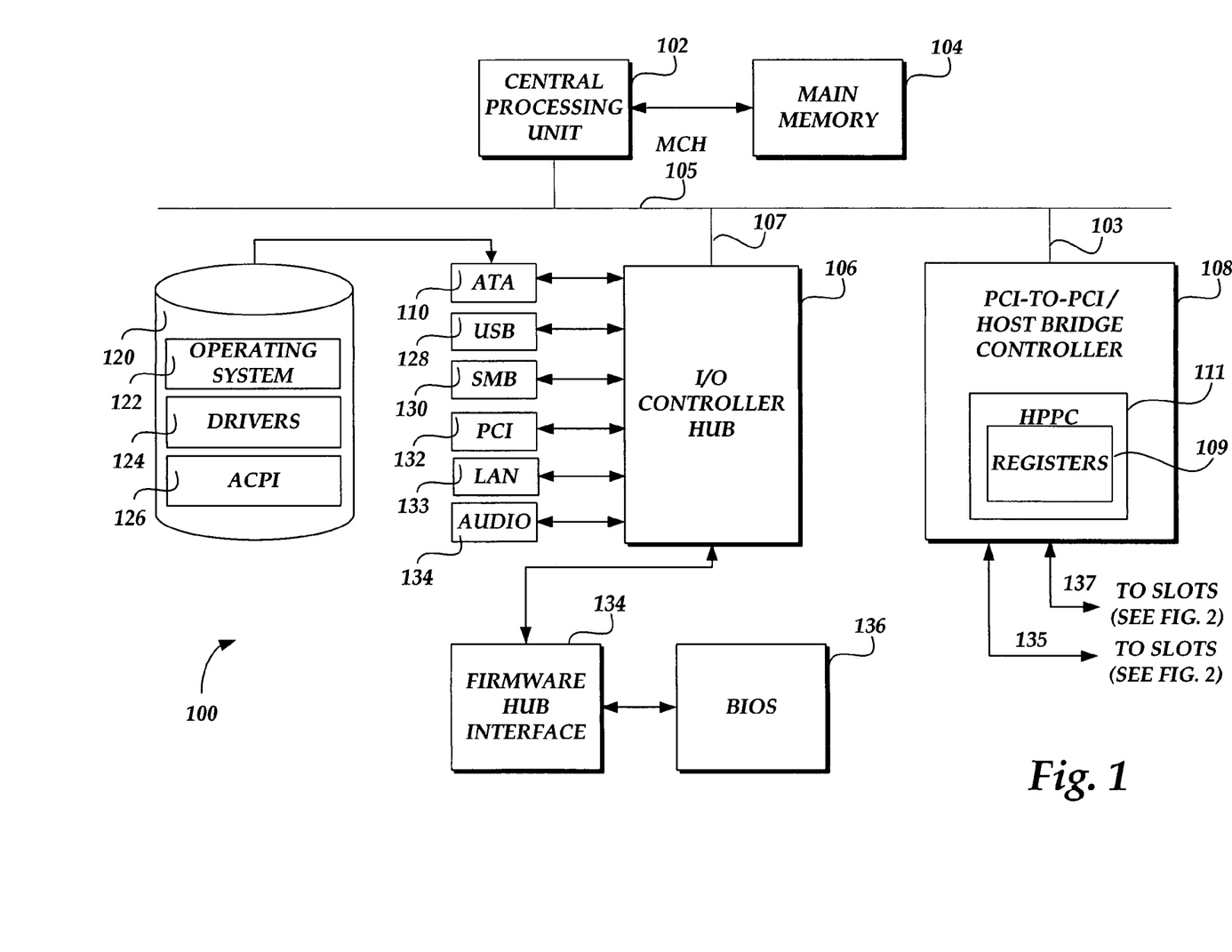
FIG. 1 illustrates a computer architecture utilized in embodiments of the invention which includes multiple host bridge devices with integrated HPPCs.

Turning now to FIG. 1, an illustrative computer architecture for a computing system 100 utilized in the various embodiments of the invention will be described. The computer architecture shown in FIG. 1 illustrates a conventional desktop or server computer based on the E7500 chipset system architecture from INTEL CORPORATION. The E7500 chipset utilizes three major components: the memory controller hub ("MCH") 105, the input/output controller hub ("ICH") 106, and one or more PCI-TO-PCI Bridges ("PPB") 108 with integrated HPPCs containing interface status registers 109.

The MCH 105 provides a hub interface connection 107 for the ICH 106 and a hub interface connection 103 for high speed input/output using the PPB 108. The MCH 105 also provides interfaces for communicating with one or more processors 102, such as the INTEL XEON family of processors. The MCH 105 also provides an interface for communicating with a main memory 104. The ICH 106 is a multi-functional input/output hub that provides an integrated Universal Serial Bus controller ("USB") 128, an Integrated Drive Electronics ("IDE") controller or other type of advanced technology attachment ("ATA") controller 110, a System Management Bus ("SMB") controller 130, a local area network ("LAN") controller 133, and audio support 134. The ATA controller 110 may interface with a mass storage device 120 containing an operating system 122, one or more drivers 124 utilized by the operating system for providing a software interface to hardware devices such as the PPBs 108, and an Advanced Configuration and Power Interface ("ACPI") 126, a software interface supported by the operating system 122 for handling insertion and removal events.

The ICH 106 may also include a firmware hub interface 134 for providing an interface to a BIOS 136. As known to those skilled in the art, the BIOS 136 is the program the computer 100 uses to get the computer system started after it has been powered on. The BIOS 100 also manages data flow between the operating system 122 and attached devices, such as the mass storage device 120. The BIOS 136 is an integral part of the computer 100 and is provided by the manufacturer. In contrast, the operating system 122 may either be preinstalled by the manufacturer or vendor or installed by a user. The BIOS 136 is made accessible to the processor 102 on an erasable programmable read-only memory ("EPROM") chip.

When the computer 100 is powered on, the processor 102 passes control to the BIOS 136. When the BIOS 136 boots up the computer, it first determines whether all of the attachments are in place and operational and then it loads the operating system 122, or key parts of it, into the main memory 104. As will be described in greater detail below, after passing control to the operating system 122, part of the BIOS 136 for runtime includes the ACPI BIOS 126 which stores a Differentiated System Description Table ("DSDT") that is sent to the system drivers 124. The DSDT, through object code, identifies each of the interrupt driven attachments within the computer 100 including the HPPCs, describes methods to evaluate the state of each attachment, and assigns each of the attachments a status stored in the TABLE and the HPPC registers 109. The DSDT is prepared and compiled during the BIOS manufacturing process. The BIOS 136 copies the DSDT from ROM to a designated area in RAM and provides a pointer to the operating system 122 where to find the designated area. Additional details regarding the PPB initialization by the ACPI 126 will be provided below.

Each of the PPBs 108 comprises a peripheral chip that performs PCI bridging functions between the MCH 105, hub interfaces 103, and PCI buses 135. In particular, each PPB 108 interfaces to the MCH 105 via a 16-bit hub interface 103. Moreover, each PPB 108 has two independent 64-bit PCI bus interfaces that can be configured to operate in either PCI or PCI-X mode. The PPB 108 provides independent buses 135 and 137. In the illustrative embodiment of the invention described herein, each of the PPBs 108 comprises an INTEL P64H2 PCI-to-PCI bridge device.

It should be appreciated that, although the embodiments of the present invention are described in conjunction with the E7500 chipset utilizing the P64H2 peripheral chip with an integrated HPPC from INTEL CORPORATION, the invention may be practiced with other types of chipsets and processors from INTEL CORPORATION and from other manufacturers. In particular, the invention as described herein may be practiced with any type of computer system architecture that supports multiple HPPCs, having multiple slots, each slot with an attention button, and that requires uniquely identifying an attention button interrupt from other interrupts sharing the same signal. Nothing herein should be read as limiting the invention as claimed herein to a particular type of computer architecture, chipset, or manufacturer.

It should also be appreciated that although the description of computer-readable media contained herein refers to a mass storage device 120, such as a hard disk or CD-ROM drive, it should be appreciated by those skilled in the art that computer-readable media can be any available media that can be accessed by the computing system 100. By way of example, and not limitation, computer-readable media may comprise computer storage media and communication media.

Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computing system 100.

Figure 2:
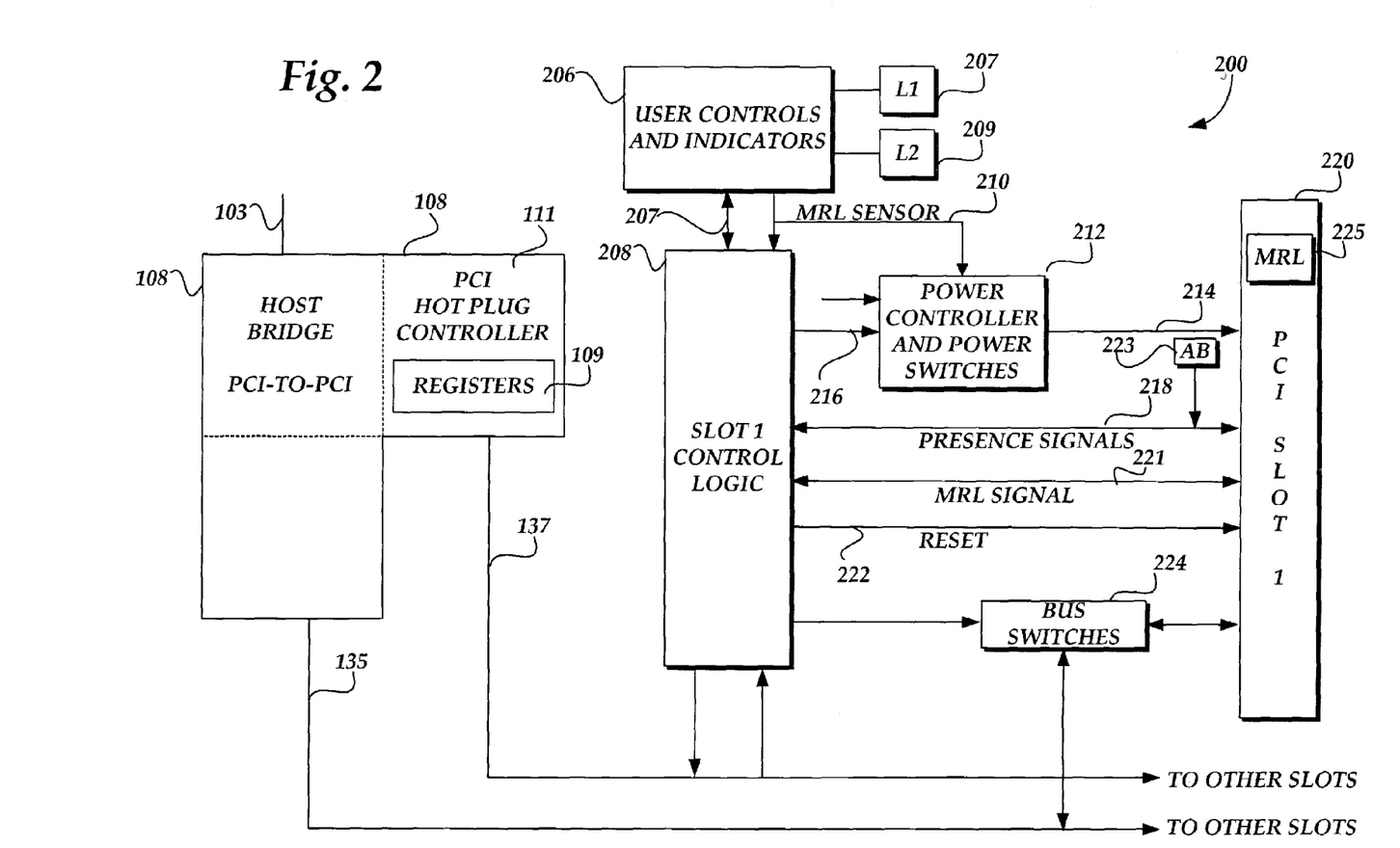
FIG. 2 illustrates a hot-plug subsystem of a hot-plug hardware implementation platform for a computer utilized in embodiments of the invention.

Referring now to FIG. 2, further details regarding a hot-plug subsystem 200 of a hardware implementation platform utilized in embodiments of the invention by the computer 100 will be described. According to the PCI Standard Hot-Plug Controller and Subsystem Specification, Revision 1.0, a hot-plug system is comprised of the PPB 108 with integrated HPPC, the PCI expansion slot 220 capable of accepting a standard form-factor PCI add-in card, the slot control logic 208 for each slot responsible for disconnecting the slot 220 from the secondary bus 135 when a power fault occurs, power controller and power switches 212 that control and monitor power to a single slot, bus switches 224 typically Field Effect Transitors ("FETs"), that connect the secondary bus signals 135 to the slots 220, and user controls and indicators 206 for each slot. The user controls and indicators include an MRL sensor 210, a power indicator 207, and an attention indicator 209. However, the attention button 223 in subsystem 200 is located adjacent to the PCI slot 220 and interfaced with one of the presence signals 218. The presence signals 218 detect the power requirements and the presence of an adapter card in the slot 220 and the press of the attention button 223. Upon the press of attention button 223 or card removal from slot 220, the presence signal changes and the HPPC must be informed as to whether the change was from an attention button to respond appropriately.

As described above, the MRL 225 is a retention latch that retains a PCI card within slot 220. When the MRL 225 is opened the MRL signal 221 changes and the MRL sensor 210 detects the change and reports the position of the MRL 225 to HPPC 107. The MRL sensor 210 reports closed when the MRL 225 is fully closed and reports open at all other times. When an unexpected opening of the MRL 225 is detected, the HPPC 107 changes the state of the slot 220 to disabled and notifies the system software. In contrast the attention button 223 is a momentary-contact push-button that is pressed by the user to initiate hot insertion or hot removal at slot 220. The power indicator 207 is usually green in color and provides visual feedback to the user by blinking when it is determined that the attention button 223 has been pushed. Once the power indicator 207 starts blinking, a five second abort interval exists during which a second depression of the attention button 223 cancels the operation and the power indicator returns to its original state of on or off. The attention indicator 209 is usually yellow or amber in color and is used to indicate that an operational problem (indicator on) exists or that the slot 220 is being identified (blinking) for a user to locate it easily. For instance, in the case of the press of an attention button 223, the attention indicator 209 will blink until the five second abort interval is completed.

Figure 3:
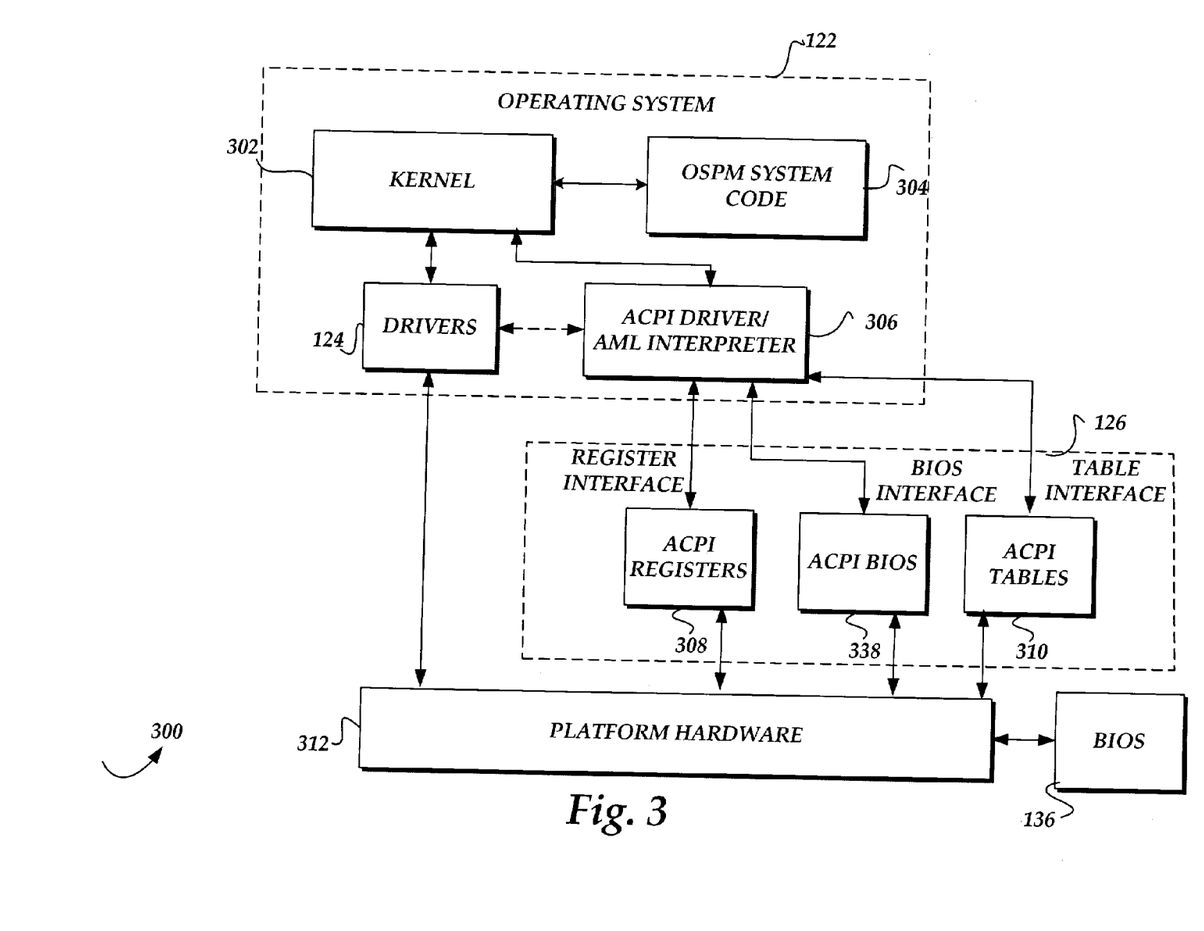
FIG. 3 illustrates an Advanced Configuration and Power Interface including software and hardware elements supported by an operating system in a HPPC computer architecture utilized in the various embodiments of the invention.

Referring now to FIG. 3, an Advanced Configuration and Power Interface including software and hardware elements supported by an operating system that directs power management in a HPPC computer architecture utilized in the various embodiments of the invention will be described. The ACPI 126 works in conjunction with the operating system 122, which directs system power management utilizing the operating system-directed power management system code ("OSPM") 304. The OSPM 304 works in conjunction with the kernel 302, device driver 305, and ACPI driver with ACPI machine language ("AML") interpreter 306 to receive and process information concerning the implementation and configuration of the platform hardware 312 described in ACPI tables 310.

There are three run-time components to ACPI 126. First, the ACPI description tables 310 describe the interfaces to the hardware. The DSDT, as part of the ACPI tables 310, contains definition blocks and can make use of AML, the interpretation of which is performed by the operating system 122. The OSPM 304 contains and utilizes the AML interpreter 306 that executes procedures encoded in AML and stored in the ACPI tables 310. Second, the ACPI registers 308 contain controls in fixed blocks and the ACPI tables 310 specify the address of the register block. Next, the ACPI BIOS 338 refers to the portion of the firmware that is compatible with the ACPI specification. This code boots the machine, implements interfaces, and provides ACPI description tables 310.

The ACPI 126 includes a complete software interface for handling insertion and removal events. The ACPI 126 handles hot-plug PCI devices by creating device objects for each slot 220 on its appropriate bus in the ACPI namespace. The ACPI namespace is a hierarchical tree structure pre-compiled within the DSDT that contains named objects. These objects may be data objects, control methods, bus/device package objects and so on. Because a PCI device may have eight functions, the namespace must list eight device objects for each slot 220. The operating system 122 parses the contents of the namespace at run-time by loading and/or unloading definition blocks from the ACPI tables 310 that reside in the ACPI BIOS 338. All the information in the ACPI namespace comes from the Differentiated System Description Table ("DSDT"), which contains the Differentiated Definition block ("DDB") and one or more other definition blocks. The DDB supplies the implementation and configuration information about the base system. The operating system 122 parses the DSDT information then creates the ACPI namespace at system boot. The operating system then utilizes the ACPI namespace during runtime for information concerning attached devices.

Each device object should include a PCI address that identifies the number for the slot and the function for the device, a control method that indicates the device is hot-ejectable, a control method that indicates whether a device is present in the slot, an object to identify which physical slot the device is in, and control methods to turn power off or on to the slot if the hardware has power controls available. A pin that signals insertion and eject requests should be wired to an ACPI GPE bit, and a control method to handle GPE bits associated with HPPC should be created. ACPI 126 discovers hardware events when a GPE is asserted and a SCI is raised.

The logical operations of the various embodiments of the present invention are implemented as (1) a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as received within the claims that form a part hereof.

Figure 4:
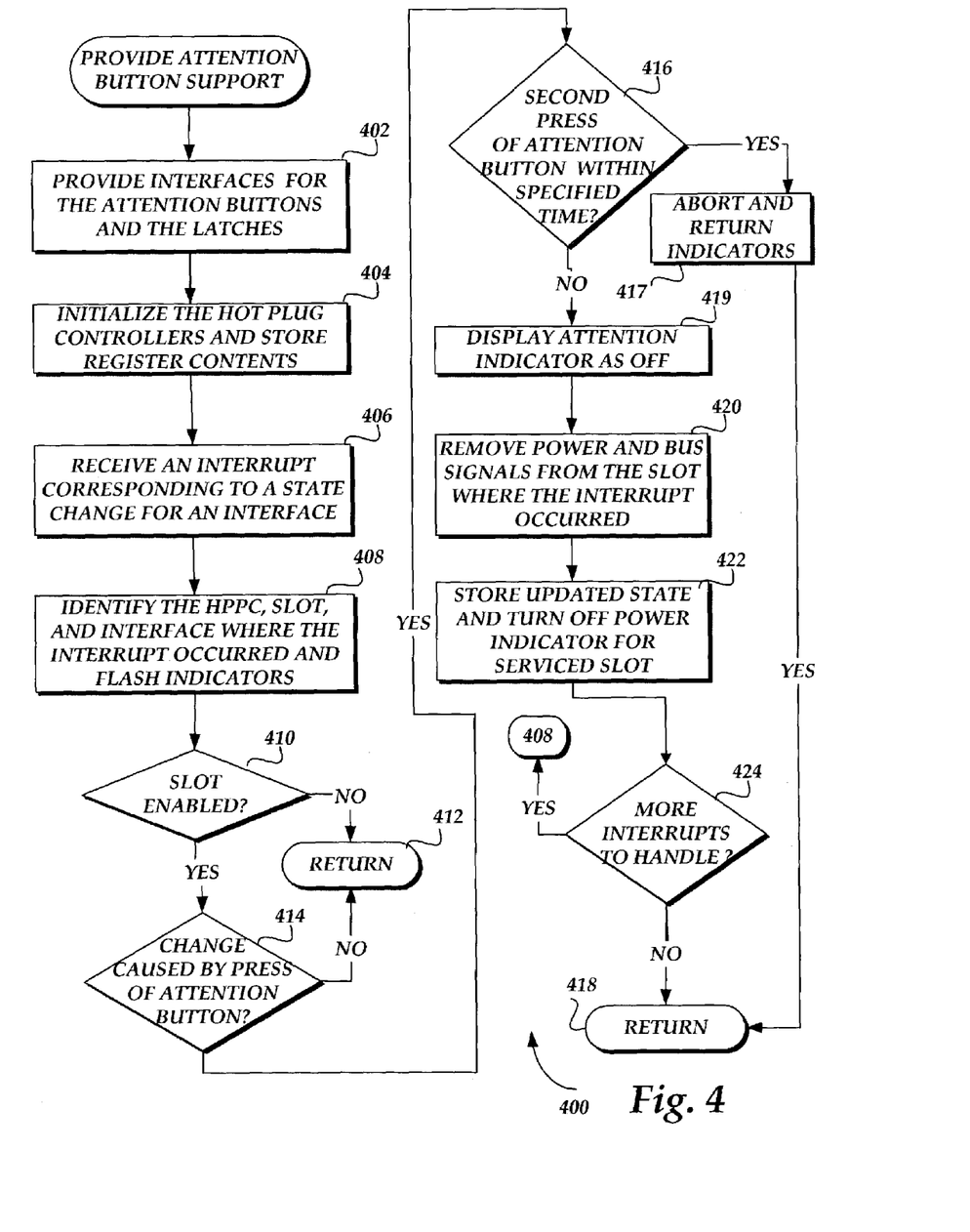
FIG. 4 illustrates an operational flow for providing attention button support according to one embodiment of the invention.

Referring now to FIGS. 2 and 4, an operational flow for providing attention button support according to one embodiment of the invention will be described. The routine 400 begins at operative 402 where interfaces are provided for the attention buttons 223 and the MRLs 225. As known to those skilled in the art HPPC attention buttons 223 and MRLs 225 each have a discrete signal tied to the HPPC 111, however in the present embodiment the attention button 223 shares a presence signal interface 218 with PCI card presence detection. Therefore the routine 400 must determine whether a change in the presence signal 218 was caused by the press of an attention 223 button or the removal or insertion of a PCI card. From operation 402, the routine 400 continues to operation 404 where the contents of the HPPC registers 109 are stored to identify the state of each slot interface prior to the occurrence on a SCI. This may be accomplished during an initialization at system boot where the ACPI 126 provides a DSDT to the operating system 122 to describe the location of hot-plug ejectable devices and their initial interface state prior to the occurrence of a SCI. The slots 225 that are empty during this initialization are disabled with regard to the presence signal 218 interrupt. More details regarding the initialization of HPPCs will be described below with respect to FIG. 5.

When a slot event, such as opening a MRL 225 or the press of an attention button, occurs the HPPC 111 asserts a GPE and the GPE generates a SCI. The routine 400 then continues from operation 404 to operation 406 where an interrupt, corresponding to a state change for either the presence or MRL interface is received. From operation 406, the routine 400 continues to operation 408 where the HPPC 111, the slot 220, and the interface where the interrupt occurred is identified. This is accomplished by comparing the HPPC registers 109 with the stored interface values prior to the SCI in order to identify a change in state for either the attention button or the MRL interface or signal for any slot 220. Next the routine 400 continues to operation 410 where a determination is made as to whether the identified slot was enabled prior to the SCI. If the slot was not enabled the routine 400 returns control to other routines at operation 412. If the slot was enabled prior to the SCI, the routine 400 continues to operation 414, where a determination is made as to whether the SCI was caused by the press of an attention button 223. This is accomplished by determining if a change occurred in the presence signal interface took place without a change to the MRL interface. Additional information with regard to determining whether an attention button was pressed will be described below with respect to FIGS. 7A–7B. If it is determined that the SCI was not due to the press of an attention button, the routine 400 returns control to other routines at operation 412.

If it is determined that the SCI was caused by the press of an attention button 223, the routine 400 continues from operation 414 to operation 416 where a determination is made as to whether a second press to the attention button has occurred within a specified time. If a second press of the attention button has occurred within a specified time the attention button request is aborted and the routine 400 continues to operation 417 where the power indicator 207 is returned to its original state and the attention indicator (LED) 209 is turned from a flashing state to off. The routine 400 then returns control to other routines at operation 418. If a second press has not occurred within a specified time, the routine 400 continues to operation 419 where the attention indicator 209 stops flashing to indicate that the abort time period has expired.

Next the routine 400 continues to operation 420 where the power and bus signals are removed from the identified slot in response to the press of the attention button 223. Then the routine 400 continues to operation 422, where the updated state of the slot 220 where the serviced interrupt occurred is stored to reflect the new state of the interface and the power indicator 207 is changed from flashing to off status. SCIs that are pending but are not serviced will not receive service or slot status updates until after the preceding SCI is serviced. The routine 400 then continues from operation 422 to operation 424 where a determination is made as to whether more SCIs are pending. If there are no other SCIs pending the routine 400 returns control to other routines at operation 418. If more interrupts are pending, the routine 400 returns to operation 408 to handle the next interrupt.

Figure 5:
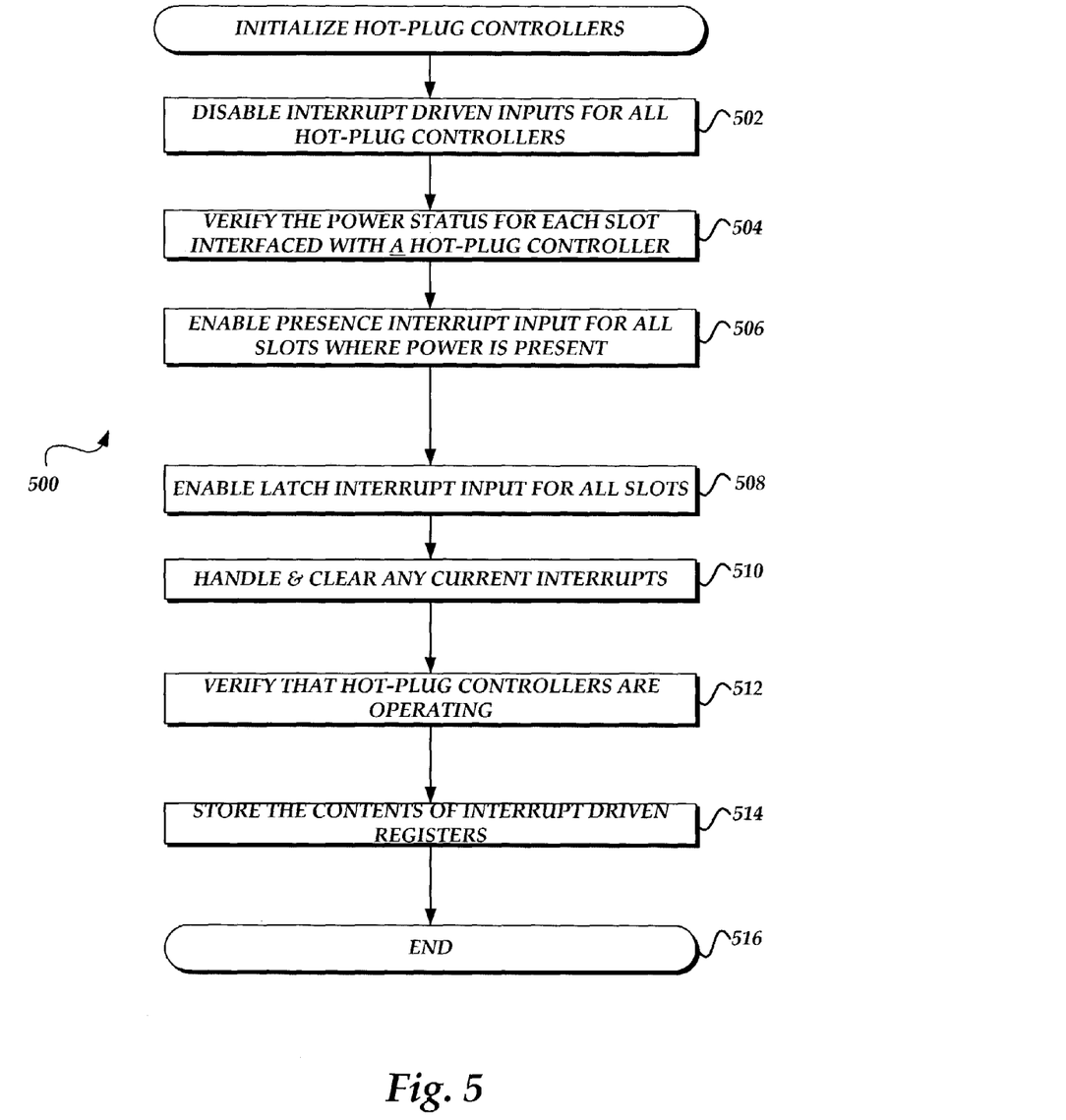
FIG. 5 illustrates an operational flow for initializing HPPCs according to one embodiment of the invention.

Turning now to FIGS. 3 and 5, an operational flow for initializing HPPCs according to one embodiment of the invention will be described. The routine 500 begins at operation 502 where the initialization methods disable or mask all interrupt driven inputs for each slot 220 and HPPC 111. This is accomplished by setting bits in the slot interrupt mask fields of the logical slot registers for each slot. Initialization occurs at system boot when the ACPI 126 through the ACPI BIOS 338, delivers to the operating system 122 a DSDT table 310 for the operating system 122, through the ACPI driver/interpreter, to interpret and run initialization ("INI") methods on in order to verify and set the initial condition of the system. Next the routine 500 continues to operation 504 where the power status of each slot for all HPPCs is verified. From operation 504 the routine 500 continues to operation 506 where if a slot is in a powered state, the presence signal 218 interrupt for that slot 220 is enabled or unmasked by clearing the interrupt mask bit in the slot interrupt mask field of the logical slot register. In contrast, if a slot is in a powered off state, the presence signal interrupt for that slot remains disabled.

After the power states are verified and the presence signal interrupts are set to enabled or disabled, the routine 500 continues to operation 508 where all the MRL interrupts are enabled or unmasked. Consequently, a GPE will be asserted for all MRLs that change position, however a GPE will not be asserted for an attention button press for a slot in a powered off state. Next, the routine 500 continues from operation 508 to operation 510 where the pending SCIs are serviced to place the hot plug controllers in an operating condition. This is accomplished by the operating system 122 and the ACPI 126 working together to apply the appropriate control methods for servicing the SCIs as they occur. The routine 500 then proceeds from operation 510 to operation 512 where the HPPCs are inspected to verify that all SCIs have been cleared and that all of the HPPCs are operating and ready to assert an interrupt if prompted by a slot event. Finally, the routine 500 continues from operation 512 to operation 514 where the states of both the presence signal and the MRL signal for each slot are stored for future reference. This is accomplished by reading the current values in the HPPC registers and storing them in the slot status field of each logical slot register. The routine 500 then terminates at operation 516.

Based on initializing the HPPCs, a determination as to whether an attention button generated the SCI may be made by determining whether the MRL signal for the identified slot has changed and verifying whether slot has an enabled or unmasked presence signal interrupt. If the slot presence signal interrupt has been disabled or masked the SCI was not generated by the attention button. In contrast if the presence signal interrupt is enabled for the identified slot and the MRL signal for that slot has not changed, then the SCI was caused by a press of the attention button for that slot.

Figure 6:
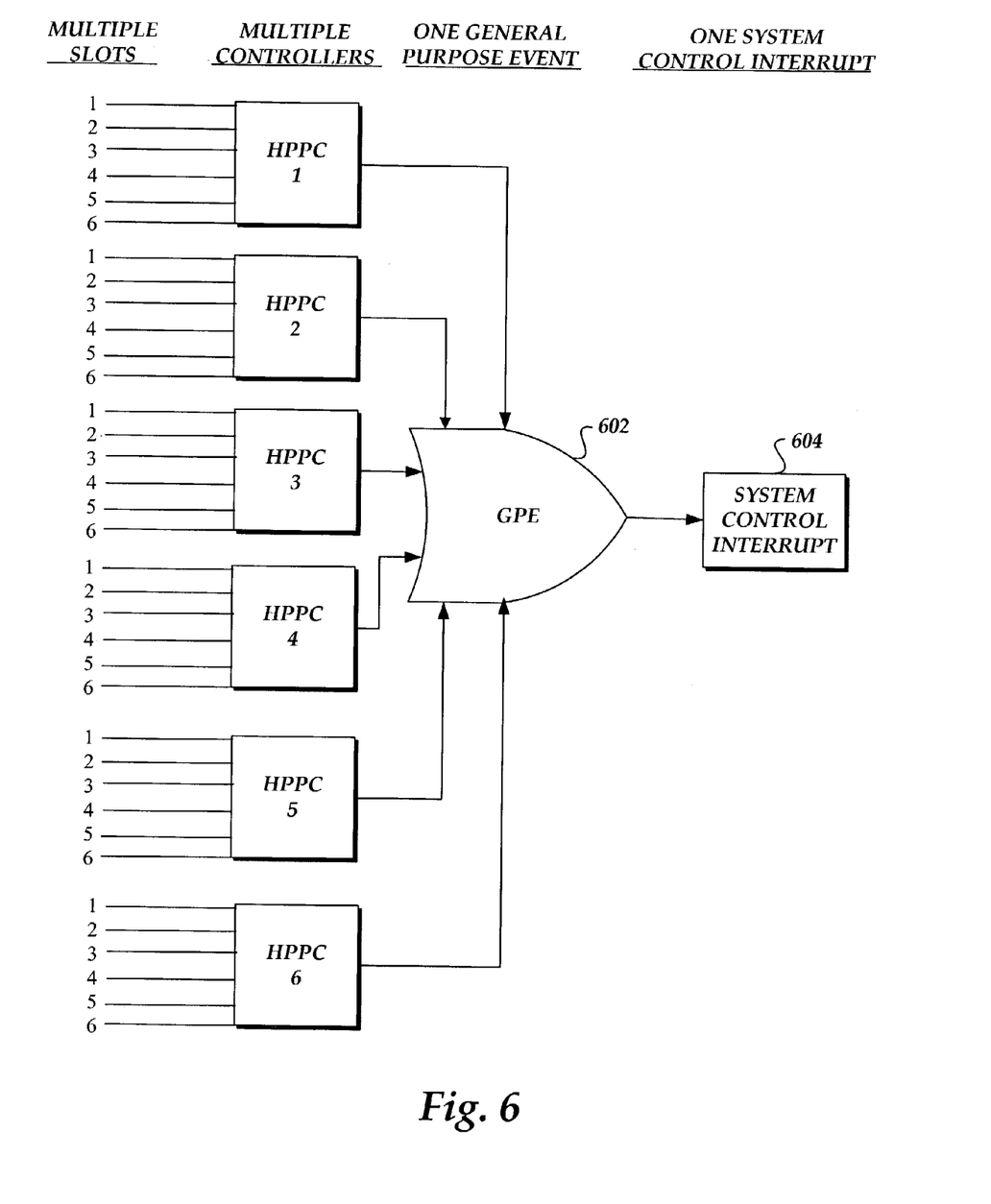
FIG. 6 illustrates a system architecture where HPPCs are wired to a single GPE bit of a core chip set and the single GPE is used for all HPPC interrupt events according to one embodiment of the invention.

Turning to FIGS. 3 and 6 a system architecture where HPPCs are wired to a single GPE bit of a core chip set and the single GPE is asserted for all HPPC slot events according to one embodiment of the invention will be described. As illustrated in FIG. 6 the P64H2 HPPC may support up to six slots and one GPE 602 may handle up to six HPPCs. The HPPCs are wired to a single GPE, in the alternative a GPE bit could be wired for event on each slot. The ACPI 126 is operative to receive an interrupt corresponding to a state change for a presence or MRL signal wherein the interrupt is generated by one general purpose event that may be asserted by any hot plug controller in response to any slot event. Slot events include a press of the attention button, an insertion or removal of a PCI card, an opening or closing of a MRL, or a slot power fault. For instance, when a user presses the attention button of slot 3, monitored by the HPPC 3, the HPPC 3 asserts a GPE 602 and the core chip set raises a SCI 604.

Next, the ACPI driver 306 clears the GPE 602 by reading the GPE status and determining which GPE caused the SCI.

Next the operating system ACPI driver 306 runs the control method associated with the GPE that caused the SCI. The control method reads the status bits from the HPPC to determine which slot the event took place on and that the event was an attention button request. The control method then notifies the driver 306. The ACPI driver 306 then requests that the plug and play system ("PNP"), through the operating system 122, eject the device in the identified slot. The PNP then queries all drivers 124 for all the device functions and instructs the device drivers 124 to unload from memory. The PCI driver then writes to configuration space in order to turn off the device per PCI power management specifications. Then the ACPI driver 306 executes an eject method that removes power and bus signals from the slot 3 and the status bit for the serviced SCI is updated.

Figure 7A:
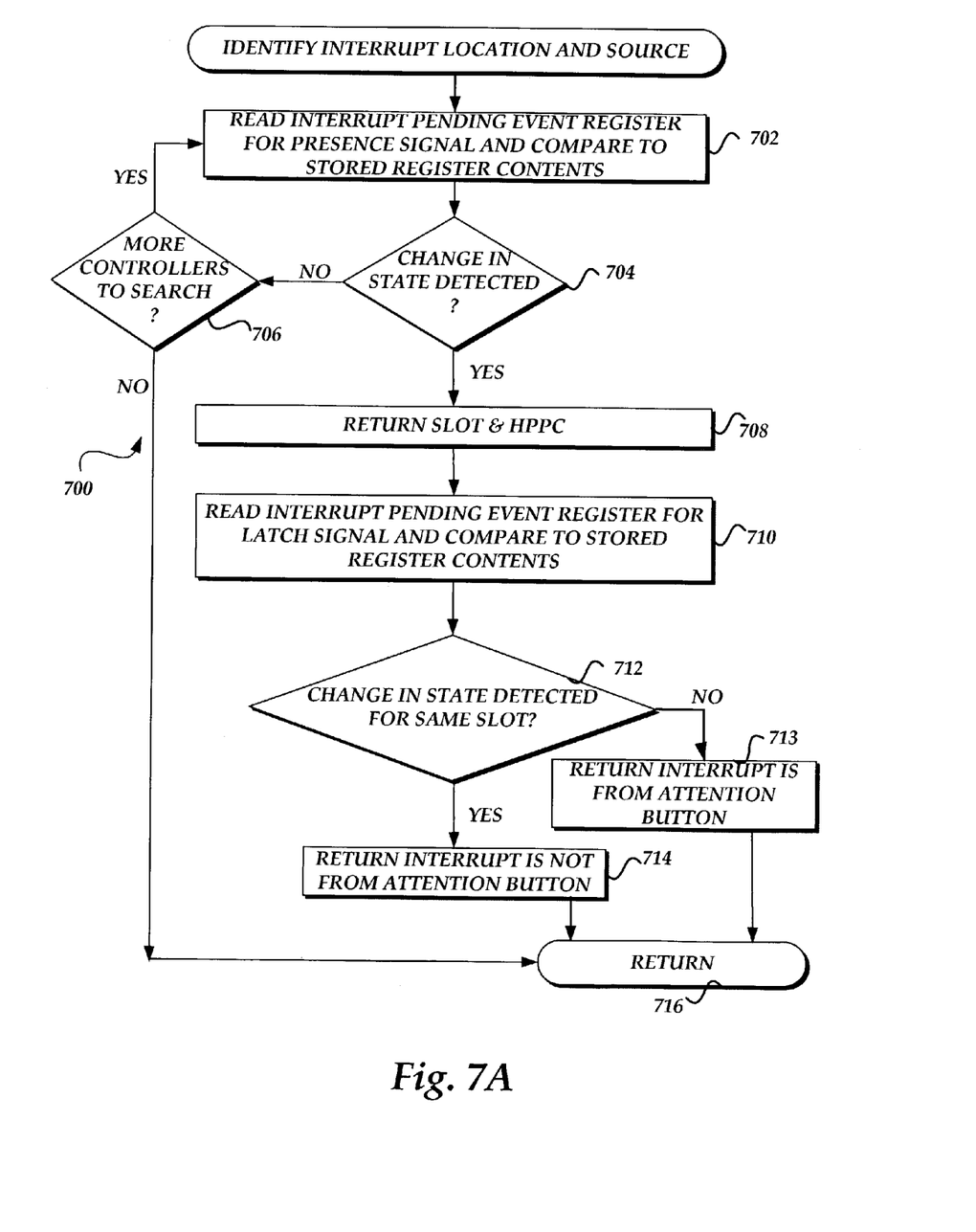
FIGS. 7A–7B illustrate an operational flow and an example of utilizing HPPC registers and stored register values for identifying a location of where an interrupt originated and whether it was originated by an attention button according to one embodiment of the invention.
Figure 7B:
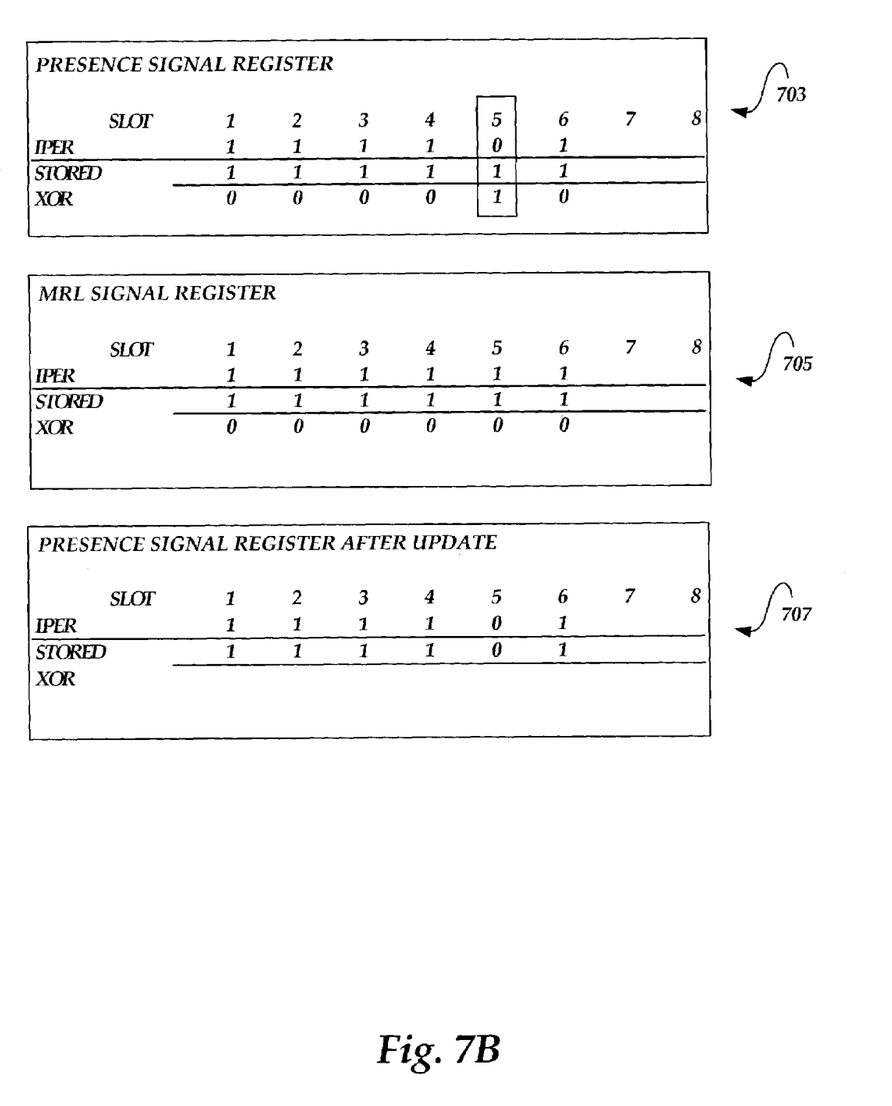

Referring now to FIGS. 7A–7B an operational flow and an example of utilizing HPPC registers and stored register values for identifying a location of where an interrupt originated and whether it was originated by an attention button according to one embodiment of the invention will be described. FIG. 7A illustrates a routine 700 for identifying an interrupt location and source. The routine 700 begins at operation 702 where a interrupt pending event register ("IPER") 702 made up of slot event latch fields is read for the presence signal of each slot in a HPPC and compared or XORed to the stored register made up of slot status fields to identify a slot where a change in the presence signal has occurred. Next, the routine 700 continues to detection operation 704 where a determination is made as to whether a change in the presence signal has occurred. If a change is not detected, the routine 700 continues to operation 706 where a determination is made as to whether there are more HPPCs to search. If there are more HPPCs to search the routine 700 returns to operation 702 to search the presence signal for each slot in another HPPC. If there are no more HPPCs to search the routine 700 returns control to other routines at operation 716.

In a change in the presence signal is detected for a slot, the routine 700 continues to operation 708 where the slot and HPPC where the interrupt occurred is identified. As illustrated in FIG. 7B, a change has occurred in slot 5 of the IPER 702. Next, the routine 700 continues to operation 710, where an IPER 703 is read for the MRL signal and compared or XORed to the stored register to identify changes in the MRL signal. The routine 700 then continues to operation 712, where a determination is made as to whether a change in the MRL signal for the same slot identified in operation 708 has occurred. If a change in the MRL signal has occurred for the same slot, the routine 700 continues to operation 714 where a non-attention button SCI source is returned and the routine then returns control to other routines at operation 716. As illustrated in FIG. 7B, a change in slot 5 of the IPER 705 for the MRL signal has not occurred. If a change in the MRL signal for the same slot has not occurred, the routine 700 continues from operation 712 to operation 713 where an attention button interrupt source is returned. The routine 700 then returns control to other routines at operation 716. FIG. 7B also illustrates the presence signal register 707 after it has been updated for the serviced SCI. Notice that slot 5 reflects a change in status. For example, power and bus signals may have been removed from the slot thereby changing the presence signal status.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for diagnosing and servicing one or more interrupts generated by one or more attention buttons each attention button associated with a hot-plug slot and sharing a first interface to a hot plug controller with the hot-plug slot in a computer system comprising:

providing a second interface between a mechanical latch for each slot and a hot plug controller;

storing the contents of one or more registers contained within each hot plug controller, the registers identifying the state of the first and second interfaces for each slot;

receiving an interrupt corresponding to a state change for the first or second interface;

in response to receiving the interrupt, identifying a one of the hot plug controllers and a one of the slots where the interrupt occurred;

determining, based on a stored state and a pending state of the first interface and a stored state and a pending state of the second interface, whether a state change in the first interface was caused by a press of the attention button; and in response to determining that the first interface state change was caused by the press of the attention button, executing a procedure to service the interrupt and store an updated state for the serviced interrupt slot.

2. The method of claim 1, wherein receiving an interrupt corresponding to a state change for the first or second interface comprises receiving a one general purpose event asserted by any of the hot-plug controllers in response to a slot event occurring in any of the respective slots of the hot-plug controller.

3. The method of claim 2, wherein the slot events comprise the press of an attention button, the removal or insertion of an adapter device, the opening or closing of a mechanical latch, or the occurrence of a power fault.

4. The method of claim 1, wherein identifying a one of the hot plug controllers and a one of the slots where the interrupt occurred comprises:

reading and comparing an interrupt pending event register for each hot plug controller with a stored state representing the state of the first or second interface before the interrupt occurred, the interrupt pending event register representing the pending state of the first or second interface for each slot; and based on the comparison, determining whether a change in the state of the first or second interface has occurred for a slot, thereby identifying a one of the hot plug controllers and a one of the slots where the interrupt occurred.

5. The method of claim 1, wherein determining, based on a stored state and a pending state of the first interface and a stored state and a pending state of the second interface, whether the state change in the first interface was caused by a press of the attention button comprises:

in response to determining a one slot where the interrupt occurred determining whether a change in the state for the second interface has occurred for the one slot by comparing the stored and pending states of the second interface for the slot; and in response to determining that no change has occurred in the slot for the second interface state, returning the press of an attention button.

6. The method of claim 5, wherein the first interface comprises a presence signal that changes state on the press of an attention button, the insertion of an adapter device to a hot plug slot, or the removal of an adapter device from a hot-plug slot.

7. The method of claim 6, wherein the interrupt may be generated by an opening or closing of the mechanical latch connected to the hot-plug slot and utilized to retain an adapter device within the slot and wherein a mechanical latch position is represented by the second interface comprising a mechanical latch signal interfaced with a hot plug controller.

8. A computer-controlled apparatus capable of performing the method of claim 1.

9. A computer storage medium comprising computer-readable instructions, which, when executed by a computer, cause the computer to perform the method of claim 1.

10. A method for diagnosing and servicing one or more interrupts generated by one or more attention buttons each attention button associated with a hot-plug slot and sharing a first interface to a hot plug controller with the hot-plug slot in a computer system comprising:
providing a second interface between a mechanical latch for each slot and a hot plug controller, wherein the first interface comprises a presence signal that changes state on the press of an attention button, the insertion of an adapter device to a hot plug slot, or the removal of an adapter device from a hot-plug slot;
storing the contents of one or more registers contained within each hot plug controller, the registers identifying the state of the first and second interfaces for each slot, wherein the contents of the registers contained within each hot plug controller are initially stored during an initialization of the hot-plug controllers, the initialization comprising
disabling all interrupts,
verifying a power status of each slot for each hot plug controller,
in response to a slot being in a powered state enabling a presence signal interrupt for the slot,
enabling a mechanical latch interrupt for all slots,
servicing each interrupt to place the hot plug controllers in an operating condition,
verifying the operating condition of the hot plug controllers, and
storing the state of the presence signal and the mechanical latch signal for each slot;
receiving an interrupt corresponding to a state change for the first or second interface, wherein the interrupt may be generated by an opening or closing of the mechanical latch connected to the hot-plug slot and utilized to retain an adapter device within the slot and wherein a mechanical latch position is represented by the second interface comprising a mechanical latch signal interfaced with a hot plug controller;
in response to receiving the interrupt, identifying a one of the hot plug controllers and a one of the slots where the interrupt occurred;
in response to identifying a one slot where the interrupt occurred, determining whether a change in the state for the second interface has occurred for the one slot by comparing the stored and pending states of the second interface for the slot;
in response to determining that no change has occurred in the slot for the second interface state, returning the press of an attention button; and
in response to determining that the first interface state change was caused by the press of the attention button, executing a procedure to service the interrupt and store an updated state for the serviced interrupt slot.

11. The method of claim 10, wherein storing the state of the presence signal and the mechanical latch signal for each slot comprises storing the contents of one or more registers contained within the hot plug controllers, said registers identifying a current status of the presence signal for each of the slots and a current status of the mechanical latch signal for each of said slots the current status of each signal becoming the stored state of the signal.

12. The method of claim 11, wherein determining whether the state change in the presence signal was caused by a press of the attention button further comprises:
based on initializing the hot plug controllers and in response to determining a one slot where the interrupt occurred, determining whether the slot has an enabled interrupt for the presence signal; and
in response to determining that the slot has an enabled interrupt for the presence signal state and that no change has occurred in the state of the mechanical latch signal, returning the press of an attention button.

13. The method of claim 12, further comprising:
in response to determining that the slot has an enabled interrupt for the presence signal and that no change has occurred in the slot for the mechanical latch signal, determining whether a second press of the attention button has occurred within a specified time;
in response to the second press not occurring within the specified time, executing a procedure to service the interrupt and storing an updated state for the presence signal; and
in response to the second press occurring within a specified time, ignoring the interrupt.

14. The method of claim 13, wherein executing a procedure to service the interrupt comprises removing one or more power and bus signals from the slot where the interrupt occurred.

15. The method of claim 13, further comprising in response to the press of an attention button, flashing an attention indicator for the specified time indicating that servicing the interrupt may be aborted by a second press of the attention button while the attention indicator is flashing.

16. The method of claim 13, further comprising in response to the press of an attention button, flashing a power indicator indicating a power operation is pending and in response to the second press occurring within a specified time returning the power indicator to on.

17. The method of claim 14, further comprising in response to the second press of an attention button not occurring, continuing to flash a power indicator until power has been removed from the slot and then turning the power indicator off.

18. A method for providing attention button support in a computer system having one or more hot-plug controllers and one or more hot-plug slots, each slot having an attention button interfaced to a hot-plug controller through a presence signal that also indicates whether an adapter card is present within the hot-plug slot, comprising:
storing the contents of one or more registers contained within the hot plug controllers, the registers identifying the status of the presence signal and a mechanical latch signal for each of the slots, the mechanical latch signal identifying whether a mechanical latch, operative to retain the adapter card within the slot, is open or closed;
receiving an interrupt corresponding to a state change for the presence signal or the mechanical latch signal, wherein the interrupt comprises a one general purpose event asserted by any of the hot plug controllers in response to one or more slot events occurring in any of the respective slots of the hot-plug controller;

in response to receiving said interrupt, reading and comparing an interrupt pending event register with a stored state of the presence and mechanical latch signals before the interrupt occurred, the interrupt pending event register representing the current state of the presence or mechanical latch signal for each slot and based on the comparison, to determine whether a change in the state of either signal has occurred and thereby identify a one of the hot plug controllers and a one of the slots where the interrupt occurred;

in response to identifying a one of the slots, determining whether the mechanical latch signal has changed and whether the slot has an enabled interrupt for the presence signal and in response to determining that the slot has an enabled interrupt for the presence signal state and that no change has occurred in the state of the mechanical latch signal, returning the press of an attention button; and in response to determining that the change in presence signal was caused by the attention button, removing power and bus signals from the slot that generated the interrupt and storing an updated status of the presence signal for the serviced interrupt.

19. The method of claim 18, wherein the slot events comprise the press of an attention button, the removal or insertion of an adapter device, or the opening or closing of a mechanical latch.

20. The method of claim 19, wherein the contents of the registers contained within each hot plug controller are initially stored during an initialization of the hot-plug controllers, the initialization comprising:

disabling all interrupts;

verifying a power status of each slot for each hot plug controller;

in response to a slot being in a powered state enabling a presence signal interrupt for the slot;

enabling a mechanical latch interrupt for all slots;

servicing each interrupt to place the hot plug controllers in an operating condition; and storing the state of the presence signal and the mechanical latch signal for each slot.

21. A computer-controlled apparatus capable of performing the method of claim 18.

22. A computer storage medium comprising computer-readable instructions, which, when executed by a computer, cause the computer to perform the method of claim 18.

23. A computer system comprising:

a processor coupled to a memory;

at least one bus coupled to the processor and capable of hosting one or more devices; and an advanced configuration and power interface basic input/output system program capable of being executed on the processor and, when executed on the processor, operative to provide a first interface between each attention button and a hot plug controller and a second interface between a latch for each slot and a hot plug controller, initialize one or more hot plug controllers thereby storing the contents of one or more registers contained within each hot plug controller, the registers identifying the state of each interface for each slot, receive an interrupt corresponding to a state change for an interface, in response to receiving the interrupt, identify a one of the hot plug controllers and a one of the slots where the interrupt occurred, determine, based on a stored state of the first interface, a current state of the first interface, and a stored state and a current state of the second interface, whether the state change in the first interface was caused by a press of the attention button, and in response to determining that the first interface state change was caused by the press of the attention button, execute a procedure to address the interrupt.

24. The computer system of claim 23, wherein the advanced configuration and power interface basic input/output system program is further operative to receive the interrupt corresponding to a state change for an interface wherein receiving the interrupt comprises receiving a one general purpose event asserted by a hot plug controller in response to one or more slot events, wherein the one general purpose event is asserted by the multiple hot plug controllers for any slot event occurring in any of the multiple slots.

25. The computer system of claim 24, wherein the advanced configuration and power interface basic input/output system program is further operative, in response to determining that the slot has an enabled interrupt for the first interface state and that no change has occurred in the slot for the second interface state, determining whether a second press of the attention button has occurred within a specified time and in response to the second press occurring within a specified time, executing a procedure to address the interrupt and in response to the second press not occurring within a specified time, ignoring the interrupt.

* * * * *